United States Patent
Hu et al.

(10) Patent No.: US 7,175,909 B2
(45) Date of Patent: Feb. 13, 2007

(54) HYDROPHILIC MAGNETIC METAL OXIDE NANOPARTICLES AND PREPARING METHOD THEREOF

(75) Inventors: Ruey-Kai Hu, Kaohsiung (TW); Hsien-Yi Chiu, Kaohsiung Hsien (TW)

(73) Assignee: Taiwan Textile Research Institute, Tu-Chen (TW)

( * ) Notice: Subject to any disclaimer, the term of this patent is extended or adjusted under 35 U.S.C. 154(b) by 0 days.

(21) Appl. No.: 11/038,926

(22) Filed: Jan. 19, 2005

(65) Prior Publication Data

US 2006/0081808 A1    Apr. 20, 2006

(30) Foreign Application Priority Data

Apr. 7, 2004    (TW) .............................. 93109655 A

(51) Int. Cl.
  *B32B 5/16*    (2006.01)
(52) U.S. Cl. ...................... 428/402; 428/403; 428/404; 428/405; 428/406; 428/407

(58) Field of Classification Search ................ 428/402, 428/403, 404, 405, 406, 407
See application file for complete search history.

(56) References Cited

U.S. PATENT DOCUMENTS

| 4,003,840 | A |   | 1/1977 | Ishino et al. |
| 4,023,174 | A |   | 5/1977 | Wright |
| 4,879,075 | A |   | 11/1989 | Hinton |
| 6,123,920 | A | * | 9/2000 | Gunther et al. .......... 424/9.322 |

* cited by examiner

*Primary Examiner*—H. T. Le
(74) *Attorney, Agent, or Firm*—Patterson & Sheridan, LLP

(57) ABSTRACT

A water-soluble polymer is used to change surfaces of the magnetic metal oxide nanoparticles to hydrophilic surfaces. The hydrophilic magnetic metal s oxide nanoparticles can be stably dispersed in a water matrix. Then, the hydrophilic magnetic metal oxide nanoparticles are mixed with hydrophilic resin, and a nanometer-scale uniform size of nanoparticles is maintained.

11 Claims, No Drawings

HYDROPHILIC MAGNETIC METAL OXIDE NANOPARTICLES AND PREPARING METHOD THEREOF

CROSS-REFERENCE TO RELATED APPLICATIONS

The present application is based on, and claims priority from, Taiwan Application Serial Number TW93109655, filed on Apr. 7, 2004, the disclosure of which is hereby incorporated by reference herein in its entirety.

BACKGROUND OF THE INVENTION

1. Field of the Invention

The present invention relates to a magnetic coating material and a method for preparing the same. More particularly, the present invention relates to hydrophilic magnetic metal oxide particles and a method for preparing the same.

2. Description of the Related Art

Electromagnetic wavelengths that can be absorbed by electromagnetic wave absorption materials are mainly divided into two ranges. One range is for commercial usage and has a frequency being about 30 MHz to about 3 GHz, which is usually studied by research institutes. The other range is for military usage to shield radars and has a frequency of about 3 GHz to above ten GHz.

Among the electromagnetic wave absorption materials, ferrite is a very important material. The chemical formula of ferrite is $MFe_2O_4$, where the M can be Fe, Mn, Co, Ni, Mg, Cu, Zn, or a mixture of the elements mentioned above. Generally speaking, if the ferrite has a better initial permeability, the ferrite has better electromagnetic wave absorption ability.

The electromagnetic wave absorption ability of the ferrite can be affected by the preparation method of ferrite. U.S. Pat. Nos. 4,003,840 and 4,023,174 state that ferrite powder has better electromagnetic wave absorption ability than ferrite clumps, which are formed by sintering. Furthermore, the particle size of the ferrite powder also affects the absorbed electromagnetic wavelength range. U.S. Pat. No. 4,879,075 has specified that the smaller the particle size of the ferrite powder, the larger the absorbed electromagnetic wavelength range. Ferrite powder that has a particle size of 50–100 nm has good absorption ability for the microwave range. Therefore, magnetic nanoparticles have good development potential in the application field of electromagnetic wave absorption.

Since the particle size of magnetic nanoparticles is quite small, the surface area of magnetic nanoparticles is very large. Thus, magnetic nanoparticles in solution tend to aggregate together to reduce surface area and thus the surface energy. If the magnetic nanoparticles aggregate together, the application value in electromagnetic wave absorption is reduced, too. Therefore, how to prevent the magnetic nanoparticles from aggregating together and how to maintain the magnetic nanoparticles in a dispersed state for a long time become a major research topic in magnetic nanoparticle research.

There are three major research directions to keep magnetic nanoparticles dispersed in solutions for a long time. The first research direction is to study how to control the electrostatic interaction among the magnetic nanoparticle surfaces. The second research direction is to study how to control the affinity between magnetic nanoparticles and solvent. The third research direction is to study how to control the magnetic nanoparticle morphology to build up the steric hinderance effect. For example, S. S. Papell combines the first and the second principles to disperse the ferrite nanoparticles in various solvents by utilizing surfactants (NASA Technical Note, Vol. NASA-TN-D-4676).

Most of the developed dispersion reagents use dipole interaction to disperse the magnetic nanoparticles. However, the interaction between the dispersion reagent and nanoparticles is weak and easily affected by environmental changes, and the dispersion efficiency is thus reduced.

SUMMARY OF THE INVENTION

In one aspect, the present invention provides hydrophilic magnetic metal oxide nanoparticles and a method of preparing the same to let the magnetic metal oxide nanoparticles stably disperse in water.

In another aspect, the present invention provides hydrophilic magnetic is metal oxide nanoparticles and a method of preparing the same to apply the hydrophilic magnetic metal oxide nanoparticles to various electromagnetic wave absorption products.

In accordance with the foregoing and other aspects of the present invention, a method of preparing hydrophilic magnetic metal oxide nanoparticles is provided. Magnetic metal oxide nanoparticles are dispersed in water, and then a polymer surface modifier is added to the water and mixed together to form an aqueous solution. An inert organic solvent is added to the aqueous solution to form a two-phase solution. Next, water is removed from the two-phase solution by fractional distilling to facilitate an esterification reaction to form hydrophilic magnetic metal oxide nanoparticles.

According to a preferred embodiment of the present invention, the particle size of the magnetic metal oxide nanoparticles is about 5–200 nm. The chemical formula of the magnetic metal oxide nanoparticles is $MFe_2O_4$, where M is Fe, Mn, Co, Ni, Mg, Cu, Zn, Ba, Sr, or a combination thereof.

The polymer surface modifier comprises a water-soluble polymer having a hydrophilic functional group, such as a carboxylic group (—COOH), that can react with the magnetic metal oxide nanoparticles. The common water-soluble polymer comprises poly(acrylic acid), poly(methyl acrylic acid), poly(maleic acid), or a copolymer thereof. The molecular weight of the water-soluble polymer is preferably about 500–5000 and more preferably about 1000–3000.

The inert organic solvent does not react with the magnetic metal oxide nanoparticles and the water-soluble polymer and is immiscible with water. The inert organic solvent comprises aromatic or aliphatic solvent, such as toluene.

The invention provides a hydrophilic magnetic metal oxide nanoparticle, is which comprises a core and an outer layer surrounding the core. The core consists essentially of magnetic metal oxide. The outer layer consists essentially of water-soluble polymer. The core and the outer surface are connected by chemical bonds.

According to a preferred embodiment of the present invention, the 20 nanoparticles are comprised of 10–80% magnetic metal oxide by weight and 20–90% polymer surface modifier by weight.

The present invention provides a preparation method of a magnetic nanoparticle coating solution. A first aqueous solution of hydrophilic magnetic metal oxide nanoparticles is mixed with a second aqueous solution of a water-soluble resin to disperse the hydrophilic magnetic metal oxide nanoparticles in the water-soluble resin, and the magnetic nanoparticle coating solution is thus obtained. The concentration of the hydrophilic magnetic metal oxide nanoparticles in the first aqueous solution is about 0.1–10% by weight, and the solid content of the water-soluble resin in the second aqueous solution is about 1–50% by weight.

The present invention provides a composition of the magnetic nanoparticle coating solution. The composition comprises hydrophilic magnetic metal oxide nanoparticles, a water-soluble resin, and water. The hydrophilic magnetic metal oxide nanoparticles comprise a core and an outer layer surrounding the core. The core consists essentially of magnetic metal oxide. The outer layer consists essentially of water-soluble polymer. The core and the outer surface are connected by chemical bonds.

According to a preferred embodiment of the present invention, the water-soluble resin, such as polyurethane, epoxy resin, acrylic resin, polyamide resin, polystyrene resin, or a derivative thereof, must stably disperse in water. In the composition of the magnetic nanoparticle coating solution, the hydrophilic magnetic metal oxide nanoparticles is about 0.1–15% by weight, and the water-soluble resin is about 5–45% by weight.

In the foregoing, the preparation method of the magnetic metal oxide 20 nanoparticles is performed in a water matrix. Therefore, the operating procedure can be simplified and cost can be saved. Moreover, after filtering, the obtained hydrophilic magnetic metal oxide nanoparticles can still stably disperse in water again to mix with an aqueous solution of a water-soluble resin, and a magnetic nanoparticle coating solution is thus obtained.

It is to be understood that both the foregoing general description and the following detailed description are by examples and are intended to provide further explanation of the invention as claimed.

DESCRIPTION OF THE PREFERRED EMBODIMENTS

This invention provides hydrophilic magnetic metal oxide nanoparticles and a method for preparing the same. A polymer surface modifier, having a hydrophilic functional group, is used to modify surfaces of magnetic metal oxide nanoparticles by an esterification reaction to stably disperse the magnetic metal oxide nanoparticles in a water matrix. Moreover, after mixing the hydrophilic magnetic metal oxide nanoparticles with a water-soluble resin, the hydrophilic magnetic metal oxide nanoparticles can maintain their particle size in the nanometer order with a uniformly distributed size.

Preparation Method of Hydrophilic Magnetic Metal Oxide Nanoparticles

Magnetic metal oxide nanoparticles are dispersed in water, and then a polymer surface modifier is mixed in. An inert organic solvent is added to form a two-phase solution. Water is removed from the two-phase solution by fractionally distilling to facilitate an esterification reaction between the polymer surface modifier and the magnetic metal oxide nanoparticles. After a period of time, hydrophilic magnetic metal oxide nanoparticles are obtained.

The particle size of the magnetic metal oxide nanoparticles is about 5–200 nm, and the general chemical formula of the magnetic metal oxide is $MFe_2O_4$, where M is Fe, Mn, Co, Ni, Mg, Cu, Zn, Ba, Sr, or any combination thereof. For example, when the M is Mn or Zn, the particle size of the magnetic metal oxide nanoparticles is about 12 nm.

The polymer surface modifier has a hydrophilic functional group, such as a carboxylic group (—COOH), that can react with the magnetic metal oxide nanoparticles. The polymer surface modifier can be, for example, a water-soluble polymer, such as poly(acrylic acid), poly(methyl acrylic acid), poly(maleic acid), or a copolymer thereof. The molecular weight of the water-soluble polymer is preferably 500–5000 and more preferably 1000–3000.

The inert organic solvent does not react with the magnetic metal oxide nanoparticles, and the water-soluble polymer is immiscible with water. The useable inert organic solvent comprises aromatic or aliphatic solvent, such as toluene.

In the esterification reaction mentioned above, an acid can be added as a catalyst. The acid comprises, for example, $H_2SO_4$, HCl, or $HNO_3$.

According to the preferred embodiment above, the obtained hydrophilic magnetic metal oxide nanoparticles can stably disperse in water again without adding any dispersion reagents after filtering. The average particle size of the hydrophilic magnetic metal oxide nanoparticles depends on the molecular weight of the polymer surface modifier and is in the range of about 50–500 nm. For example, if the polymer surface modifier is poly(acrylic acid), the particle size of the hydrophilic nanoparticles is about 300 nm when the molecular weight of the poly(acrylic acid) is about 1200.

Thermal gravimetric analysis is used to analyze the composition of the hydrophilic magnetic metal oxide nanoparticles. The content of the magnetic metal oxide is about 10–80% by weight, depending on the molecular weight of the polymer surface modifier. That is, the content of the surface modifier is about 20–90% by weight. For example, if the polymer surface modifier is poly(acrylic acid), the weight ratio of the magnetic metal oxide to the polymer is about 3:2 when the molecular weight of the poly(acrylic acid) is about 2000.

According to the preparation method of the hydrophilic magnetic metal oxide nanoparticles described above, a working example is provided below.

40 g of an aqueous solution of ferrite nanoparticles (10 wt. %), 40 g of poly(acrylic acid) (45 wt. %, molecular weight is about 1200, produced by Aldrich), and 1 g $H_2SO_4$ (98 wt. %) are mixed and agitated. The ferrite nanoparticles can be prepared by co-precipitation or hydrothermal methods, and the average particle size of the ferrite is about 100 nm.

For example, co-precipitation, according to the Reimers process (IEEE Trans. Magn. MAG-16(1980)178), is used to synthesize the ferrite nanoparticles.

Two moles of $FeCl_2$ $4H_2O$ and three moles of $FeCl_3$ $6H_2O$ are dissolved in 50 mL of deionized water. 100 mL of ammonia (about 28 wt. %) is added during agitation. Ferrite precipitates are obtained after a few minutes.

Then, 100 g of toluene is added to the resultant ferrite suspension solution described above to form a two-phase solution. The two-phase solution is heated in an oil bath at about 90° C. to remove the water by fractionally distilling the two-phase solution. Thus, the esterification reaction can be driven toward the ester product side faster and more completely. After continually agitating for about 6 hours, hydrophilic magnetic metal oxide nanoparticles are obtained.

Preparation Method of Magnetic Nanoparticles Coating Solution

An aqueous solution of hydrophilic magnetic metal oxide nanoparticles (0.1–10% by weight) is mixed with an aqueous solution of a water-soluble resin (1–50% by weight) to disperse the hydrophilic magnetic metal oxide nanoparticles in the water-soluble resin. Hence, a magnetic nanoparticle coating solution is obtained.

The water-soluble resin, such as polyurethane, epoxy resin, acrylic resin, polyamide resin, polystyrene resin, or any derivatives thereof, must stably disperse in water.

In the composition of the magnetic nanoparticles coating solution, the hydrophilic magnetic metal oxide nanoparticles is about 0.1–15% by weight, and the water-soluble resin is about 5–45% by weight. Thus, the water is about 20–95% by weight.

According to the preferred embodiment of the present invention described above, a working example is provided below.

20 g of an aqueous solution of hydrophilic magnetic metal oxide nanoparticles is mixed with 20 g of an aqueous solution of polyurethane resin. The polymer used in synthesizing the hydrophilic magnetic metal oxide nanoparticles is poly(acrylic acid), and the molecular weight of the poly(acrylic acid) is about 2000. The concentration of the aqueous solution of the hydrophilic magnetic metal oxide nanoparticles is about 5% by weight, and the solid content of the aqueous solution of polyurethane resin is about 30% by weight. After agitating for about 30 minutes, a serous solution of water-soluble resin dispersing hydrophilic magnetic metal oxide nanoparticles is obtained.

The average particle size of the hydrophilic magnetic metal oxide nanoparticles in the serous solution is about 140 nm, measured by a dynamic light scattering particle size analyzer. Next, a stability test is performed. The serous solution of the magnetic nanoparticles is heated at about 40° C. for 1 day, and the average particle size of the hydrophilic magnetic metal oxide nanoparticles is then measured. The measured particle size is still maintained at about 140 nm, and the magnetic nanoparticles are still dispersed in the serous solution without aggregating to form precipitates.

In light of foregoing, the advantages of the present invention comprise the following:

1. Both of the surface modification and the dispersing process of the magnetic metal oxide nanoparticles are performed in an aqueous matrix. Therefore, the operation procedures can be simplified and the cost can be reduced.

2. The surface modification of the magnetic metal oxide nanoparticles is performed under a temperature of only 90° C. for the esterification reaction. The reaction temperature for the esterification reaction is much lower than the dehydration reaction of two hydroxyl groups in the prior arts. Hence, the cost is much lower.

3. Only a small amount of organic solvent is added during the whole preparation process of the hydrophilic magnetic nanoparticles for removing water. Therefore, the environmental contamination is much less.

4. The hydrophilic magnetic metal oxide nanoparticles can stably disperse in the water-soluble resin; hence the applicability of hydrophilic magnetic metal oxide nanoparticles in the coating industry has a great development potential.

The applications include electromagnetic wave absorption textiles, electronic device protection, electromagnetic wave absorption materials, magnetic material coatings, and magnetic fluids.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A composition of a magnetic nanoparticle coating solution, comprising:
   hydrophilic magnetic metal oxide nanoparticles, comprising:
      a core, consisting essentially of magnetic metal oxide; and
      an outer layer surrounding the core, consisting essentially of a water-soluble polymer and connecting to the core by chemical bonds formed by an esterification reaction between carboxylic groups of the water-soluble polymer and the core;
   a water-soluble resin; and
   water.

2. The composition of claim 1, wherein the hydrophilic magnetic metal oxide nanoparticles is between about 0.1–15% by weight.

3. The composition of claim 1, wherein the water-soluble resin is between about 5–45% by weight.

4. The composition of claim 1, wherein the water is between about 20–95% by weight.

5. The composition of claim 1, wherein a particle size of the hydrophilic magnetic metal oxide nanoparticles is between about 50–500 nm.

6. The composition of claim 1, wherein the magnetic metal oxide is between about 10–80% by weight and the water-soluble polymer is between about 20–90% by weight of the hydrophilic magnetic metal oxide nanoparticles.

7. The composition of claim 1, wherein the magnetic metal oxide is $MFe_2O_4$, where M is selected form a group consisting of Fe, Mn, Co, Ni, Mg, Cu, Zn, Ba, Sr, and a combination thereof.

8. The composition of claim 1, wherein the water-soluble polymer comprises poly(acrylic acid), poly(methyl acrylic acid), poly(maleic acid), or a copolymer thereof.

9. The composition of claim 1, wherein a molecular weight of the water-soluble polymer is between about 500–5000.

10. The composition of claim 1, wherein a molecular weight of the water-soluble polymer is between about 1000–3000.

11. The composition of claim 1, wherein the water-soluble resin comprises polyurethane, epoxy resin, acrylic resin, polyamide resin, polystyrene resin, or a derivative thereof stably disperse in water.

* * * * *